L. EMERY.
FLY TRAP.
APPLICATION FILED MAY 23, 1912.
1,040,295.
Patented Oct. 8, 1912.
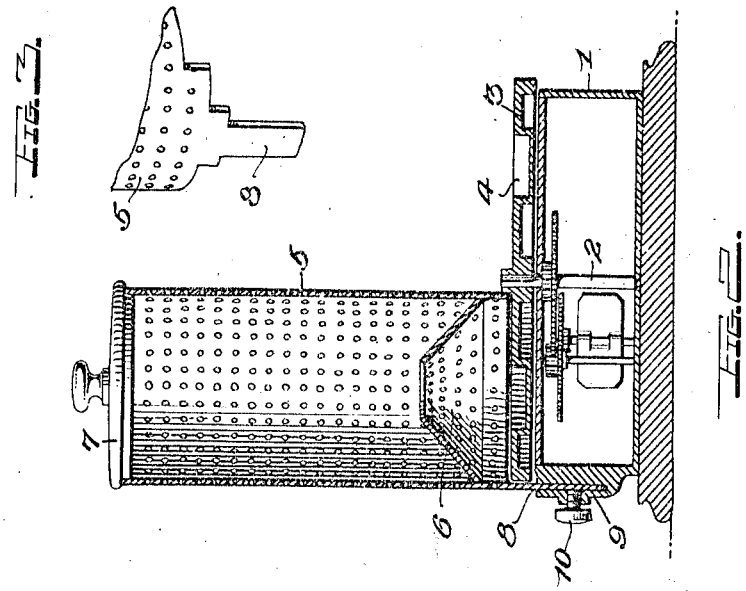
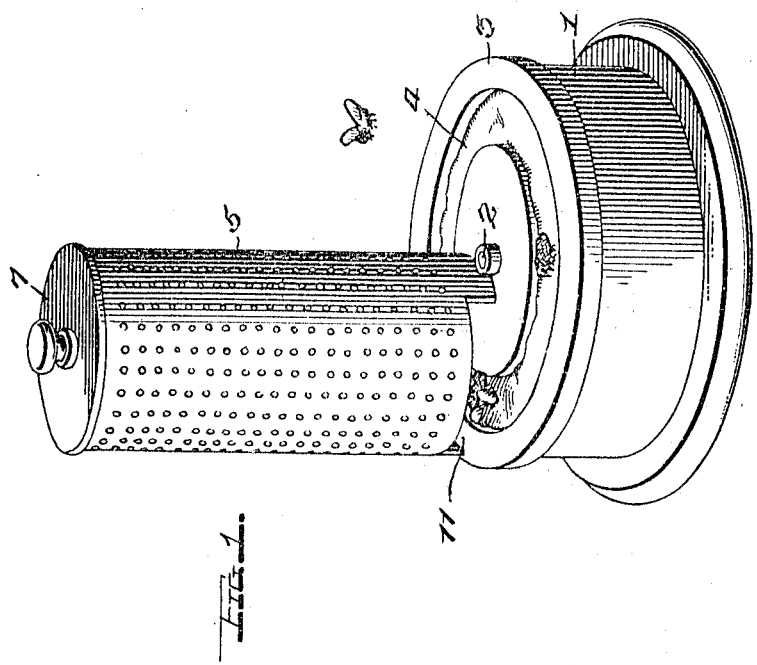
Witnesses
Chas. L. Griestauer
A. B. Norton.
Inventor
Louis Emery,
By Watson E. Coleman.
Attorney

UNITED STATES PATENT OFFICE.

LOUIS EMERY, OF NEW YORK, N. Y.

FLY-TRAP.

1,040,295.  Specification of Letters Patent.  Patented Oct. 8, 1912.

Application filed May 23, 1912. Serial No. 699,273.

*To all whom it may concern:*

Be it known that I, LOUIS EMERY, a citizen of France, residing at New York, in the county of New York and State of New York, have invented certain new and useful Improvements in Fly-Traps, of which the following is a specification, reference being had to the accompanying drawings.

My invention relates to new and useful improvements in devices known as fly traps and more particularly to the class of traps wherein the fly receiver is retained stationary, while the bait carrier is moved to carry the flies in position to be entrapped.

The primary object of the invention is to provide a simple and efficient device of this character composed of few and simple parts which may be readily set up for use or taken down when desired.

A further object of the invention resides in providing means for removably securing the fly retainer in position on the base portion of the device and a still further object resides in providing a device which is simple and durable in construction, inexpensive to manufacture and one which will be very efficient in use.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view of the device set up for operation; Fig. 2 is a vertical section therethrough, and Fig. 3 is a fragmentary perspective view of the lower end of the fly retainer.

In describing my invention, I shall refer to the drawing in which similar reference characters designate corresponding parts throughout the several views and in which—

1 indicates a hollow housing formed preferably cylindrical and of any desired size to provide the base portion of the device. This housing, in addition to forming the base portion for the device is a casing for any desired form of motor (not shown) which is adapted to cause a central shaft 2 to be rotated.

Secured on the central shaft 2 in any desired manner is a circular plate or disk 3, the upper face of which is provided with an annular groove or channel 4 adapted to receive therein any suitable bait, such as sugar, jelly or other sweets. This disk is adapted to be rotated quite slowly, whereby insects will not be deterred from alighting thereon, nor caused to fly away from the disk after having once alighted and in order to entrap said insects after having alighted on the disk, I provide my improved receiver or retainer. This receiver or retainer comprises a cylindrical body 5 formed of foraminous material, the bottom of which is open and fitted within this bottom is a cone-shaped member 6 also formed of foraminous material and having an opening in the upper end thereof disposed within the body of the receptacle or member 5.

The body or receptacle 5 is provided with a removable lid or closure 7 and in order to support the device on the base of the housing 1, a tongue 8 is formed on the lower peripheral edge of said body 5 and is adapted to be received in a keeper or the like 9 provided on the peripheral edge of the housing 1. A set screw 10 extending through said keeper 9 is adapted to be engaged with the tongue 8 to adjustably secure the same therein and correspondingly support the cylindrical body member 5 in position over the rotating disk 3. In order to permit the flies on the disk to be brought into position immediately below the receiver 5, the lower edge thereof is cut-away as shown at 11. Thus as the disk is rotated, the flies thereon will be brought below the receiver 5 and frightened to such an extent as to fly upwardly through the cone 6 and into the body to be entrapped. Should at any time it be desired to separate the parts of the device, it will be seen that the same may be readily accomplished by first removing the retainer or receiver 5 and then removing the disk 3.

From the foregoing description of the construction of my device, the operation thereof will be readily understood and it will be seen that I have provided a simple, and inexpensive device which will be most efficient in carrying out the objects for which the same is designed.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

A fly trap of the class described comprising a base, a rotatable disk thereon, said disk being provided with an annular channel adapted to receive bait therein, a cylindrical receiver formed of foraminous material, the lower peripheral edge of which is cut-away a portion of its circumference, an integral depending tongue formed on the lower peripheral edge of said receiver, a keeper provided on the outer wall of said base and adapted to receive the tongue of said receiver, and means to adjustably and removably secure said tongue in the keeper whereby said receiver will be disposed in a predetermined position over said disk.

In testimony whereof I hereunto affix my signature in the presence of two witnesses.

LOUIS EMERY.

Witnesses:
 CONSTANTIN BESANÇON,
 JAMES O'HARA.